(No Model.)  2 Sheets—Sheet 1.

O. C. WOLF.
DRIVING GEARING FOR HEAVY MACHINERY.

No. 526,281.  Patented Sept. 18, 1894.

Witnesses:
Murray C. Boyer.
A. V. Groupe.

Inventor:
Otto C. Wolf
by his Attorneys
Howson & Howson (No Model.) 2 Sheets—Sheet 2.

O. C. WOLF.
DRIVING GEARING FOR HEAVY MACHINERY.

No. 526,281. Patented Sept. 18, 1894.

Witnesses:
Murray B. Boyer.
A. V. Groupe.

Inventor:
Otto C. Wolf
by his Attorneys
Howson & Howson

UNITED STATES PATENT OFFICE.

OTTO C. WOLF, OF PHILADELPHIA, PENNSYLVANIA.

DRIVING-GEARING FOR HEAVY MACHINERY.

SPECIFICATION forming part of Letters Patent No. 526,281, dated September 18, 1894.

Application filed October 6, 1890. Serial No. 367,168. (No model.)

*To all whom it may concern:*

Be it known that I, OTTO C. WOLF, a citizen of the United States, and a resident of Philadelphia, Pennsylvania, have invented certain Improvements in Driving-Gearing for Heavy Machinery, of which the following is a specification.

My improved gearing has been devised especially for use in connection with what are known as "mash" machines used in malt houses and breweries, one object of my invention being to prevent any derangement of the driving parts such as might otherwise be caused by the settling or vertical displacement of the machine, and a further object being to provide for the location of the driving shaft in any relation to the machine which may be the most convenient. These objects I attain in the manner hereinafter set forth, reference being had to the accompanying drawings, in which—

Figure 1:
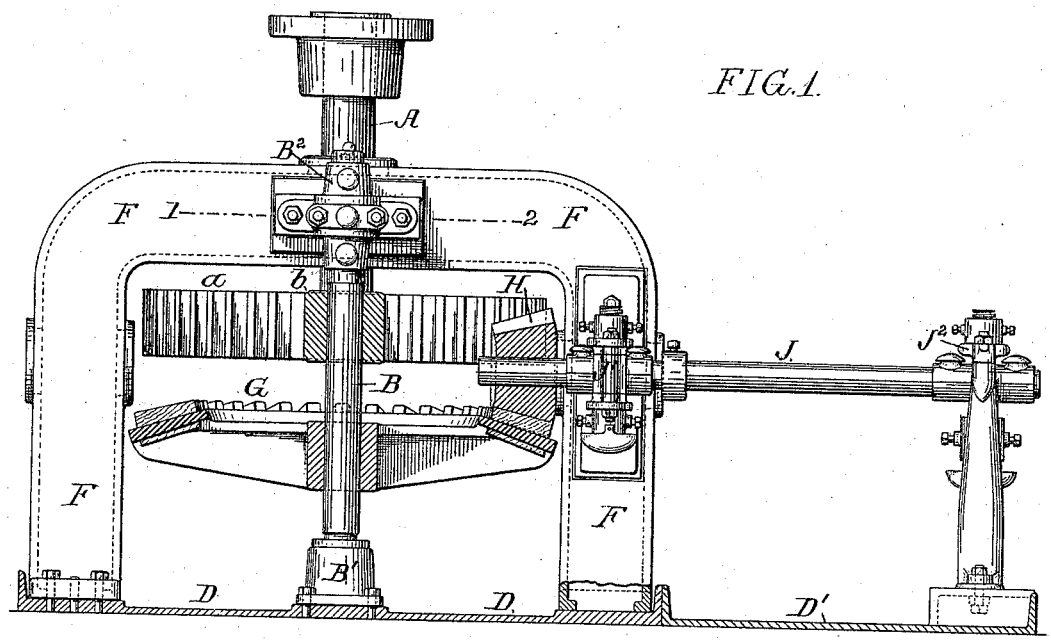
Figure 2:
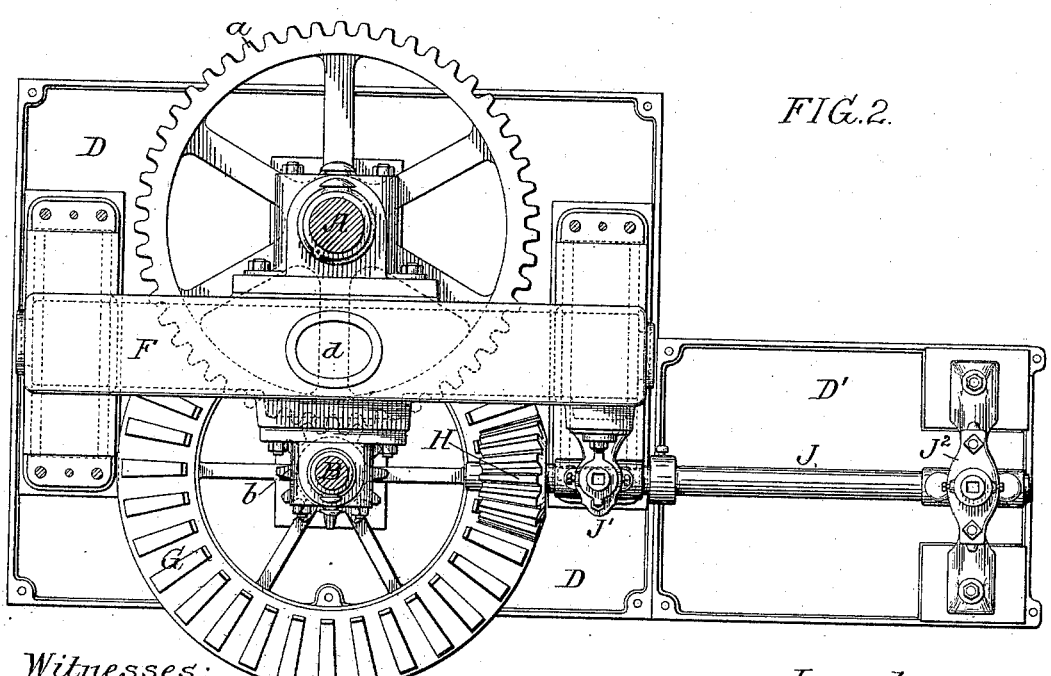
Figure 3:
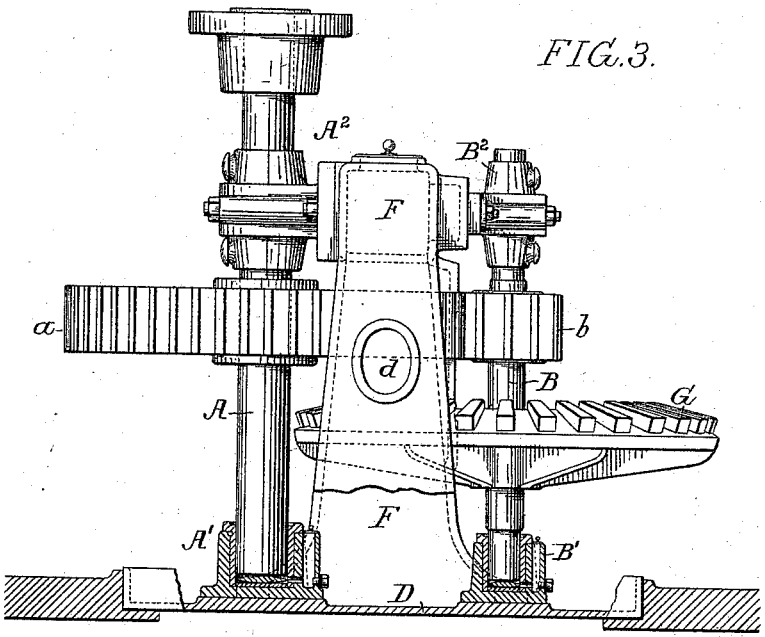
Figure 4:
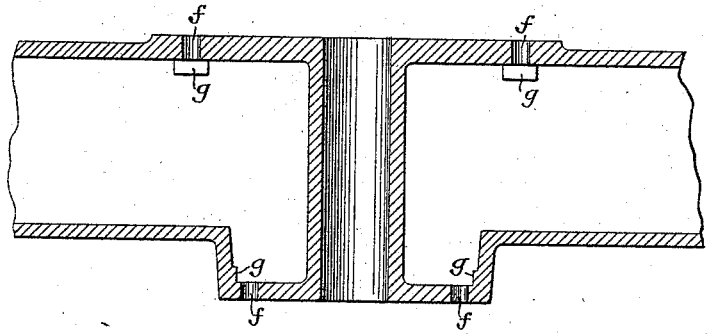

Figure 1, is a view, partly in section and partly in side elevation, of driving gearing constructed in accordance with my invention. Fig. 2, is a plan view partly in section. Fig. 3, is an end view partly in section; and Fig. 4, is an enlarged sectional plan view of part of the fixed frame or standard, the section being taken on the line 1—2, Fig. 1.

In driving "mash" machines, and other heavy pieces of machinery, difficulty is often experienced because of the driving gearing being deranged or rendered inoperative by reason of the settling of the floor or foundation upon which the machine is erected. Inconvenience is also frequently caused by the necessity of locating the driving shaft in a certain fixed relation to the machine, or else designing a special mounting for the gearing to adapt the latter to the location of the machine. In carrying out my invention with the view of overcoming these objections, I provide the vertical shaft A, of the machine which is to be driven, with a spur wheel $a$, with which meshes a pinion $b$, on a second vertical shaft B, both of these shafts being mounted at their lower ends in step bearings A', B', secured to a bed plate D, the upper portions of the shafts being adapted, respectively, to bearings $A^2$, $B^2$, mounted upon the opposite sides of the transverse upper portion of the main supporting frame F, the latter having, at each end, depending legs or standards securely bolted to the bed plate D.

The shaft B, is provided with a bevel wheel G, and meshing with this bevel wheel is a bevel pinion H, on a horizontal driving shaft J, the latter being adapted to a bearing J', mounted upon one of the depending standards of the frame F, and to a bearing $J^2$, mounted upon a supplementary bed plate D'. It will be evident therefore that any settling or sinking of the machine, or any slight vertical displacement of the shaft A, from any cause, will not derange or render inoperative the gearing for driving said shaft, as the meshing of the spur wheel $a$, and the pinion $b$, is not materially affected by such settling, nor can the latter have any effect upon the proper meshing of the bevel wheel G, and pinion H.

The frame F, is preferably made in the form of a hollow box girder, the depending portions of the frame being suitably expanded at their lower ends for attachment to the bed plate D, and openings $d$, are formed in the frame F, in the proper relation to the bearings mounted upon said frame so as to permit of the introduction of the bolts whereby said bearings are secured to the frame; and in order to prevent the turning of said bolts while the nuts which confine the bearings are being screwed up on the same, I form on the interior of the frame, adjacent to each bolt hole $f$, a lug, projection or shoulder $g$, which, by contact with the head of the bolt, serves to prevent the turning of the same.

It will be evident that in gearing constructed in accordance with my invention the shaft B, may be located at any point in a circle drawn through said shaft, and having the axis of the shaft A, as its center, or the position of the shafts A and B in respect to the frame F, may be reversed, and the supplementary bed plate D', and its shaft bearing may be located at either corner of either the right or left hand side of the main bed plate D; hence, the driving shaft may be disposed in any relation which may be found most convenient in respect to the machine to be driven.

Having thus described my invention, I claim and desire to secure by Letters Patent—

The combination of the vertical shaft to be driven, a horizontal driving shaft, an intermediate vertical shaft, spur gearing connecting the driven shaft and intermediate shaft, bevel gearing connecting the intermediate shaft and the driving shaft, a bed plate having a frame or standard with bearings for the three shafts, and a supplementary bed plate adapted to be connected at either corner of the right or left hand side of said main bed plate and having a second bearing for the driving shaft, substantially as specified.

In testimony whereof I have signed my name to this specification in the presence of two subscribing witnesses.

OTTO C. WOLF.

Witnesses:
WILLIAM D. CONNER,
HARRY SMITH.